United States Patent [19]

Ball et al.

[11] Patent Number: 4,847,341
[45] Date of Patent: Jul. 11, 1989

[54] NOVEL POLYMERIZATION PROCESS

[75] Inventors: Peter Ball, Emmerting; Klaus Marquardt; Manfred Selig, both of Burghausen, all of Fed. Rep. of Germany

[73] Assignee: Wacker-Chemie GmbH, Fed. Rep. of Germany

[21] Appl. No.: 100,469

[22] Filed: Sep. 24, 1987

Related U.S. Application Data

[63] Continuation of Ser. No. 790,841, Oct. 24, 1985, abandoned, which is a continuation-in-part of Ser. No. 594,545, Mar. 29, 1984, abandoned.

[30] Foreign Application Priority Data

Apr. 5, 1983 [DE] Fed. Rep. of Germany ....... 3312255

[51] Int. Cl.[4] ................................................ C08F 2/24
[52] U.S. Cl. .................................... 526/201; 526/78; 526/287; 526/318.25
[58] Field of Search ................ 524/834; 526/201, 287, 526/225, 344.2, 324, 329

[56] References Cited

U.S. PATENT DOCUMENTS 4,073,779  2/1978  Wiest .................................... 526/287
4,528,337  7/1985  Kreilein ................................ 526/88

Primary Examiner—Christopher Henderson
Attorney, Agent, or Firm—Bierman and Muserlian

[57] ABSTRACT

A process for the preparation of finely-divided aqueous copolymer dispersions with a solids content of 10 to 70% by weight, based on the dispersion, comprising emulsion polymerizing (a) 1 to 50% by weight of ethylene and (b) 99 to 50% by weight of at least two ethylenically unsaturated comonomers in the presence of a free-radical initiator and at least one member of the group consisting of emulsifier and a protective colloid and optionally present conventional adjuvants, the ethylenically unsaturataed comonomers being (b1) 79.5 to 99.5% by weight of vinyl chloride, (b2) 0 to 15% by weight of ethylenically unsaturated oil-soluble monomers, (b3) 0.5 to 10% by weight of ethylenically unsaturated, functional, water-soluble monomers and (b4) 0 to 5% by weight of oil-soluble monomers monoethylenically unsaturated and containing functional groups or polyethylenically unsaturated and mixtures thereof with the proviso that the monomers of (b2) and (b4) are copolymerizable with (a) and (b1), the comonomers being initially present in 1 to 40% by weight and the content of the water-soluble monomers being 1 to 35% by weight of the comonomers phase initially present and the rest of component (b) being added as an aqueous emulsion during polymerization and the polymerization is effected at 0° to 120° C. with an ethylene pressure of 10 to 150 bar which is built up at the latest by the point in time at which polymerization of the initial material is complete.

9 Claims, No Drawings

4,847,341

NOVEL POLYMERIZATION PROCESS

PRIOR APPLICATION

This is a continuation of U.S. Patent Application Ser. No. 790,841 filed Oct. 24, 1985, now abandoned, which is a continuation-in-part application of copending U.S. patent application Ser. No. 594,545 filed Mar. 29, 1984, now abandoned.

STATE OF THE ART

Aqueous copolymer dispersions, especially those of copolymers having a predominant content of vinyl chloride (VC) and ethylene (E), are very well suited for use as binders for paints, paper coatings or textile coatings and as melt adhesives but the copolymers contained therein can also be processed, after the water has been separated off, to form shaped articles such as conduits or insulation for electrical conductors. Since vinyl chloride and ethylene as raw material are more favorably priced than are other ethylenically unsaturated monomers because they are simple to manufacture or obtain on an industrial scale, polymers consisting essentially of vinyl chloride and ethylene are specially important in an age of rising raw material costs.

The manufacture of emulsion polymers comprising predominantly vinyl chloride and ethylene is, however, very difficult as high pressures and hence very expensive autoclave installations are required to incorporate appreciable amounts of ethylene into the polymer. Thus, for example U.S. Pat. No. 3,403,137 describes a process for the manufacture of copolymers of ethylene and vinyl chloride, in wich pressures as high as over 1000 psi (over 69 bar) are required to obtain a content of approximately 10% by weight of ethylene units in the copolymer. To introduce by polymerization, for example 24% by weight of ethylene into the polymer, a pressure of over 1000 bar is necessary (cf. Example 4) and even pressures of over 3447 bar are not excluded in that application.

U.S. Pat. No. 3,647,615 and No. 3,428,582 describe the incorporation of water-soluble auxiliary monomers such as acrylamide, N-methylolacrylamide or acrylic acid into the vinyl chloride-ethylene copolymer to modify the colloidal and adhesive properties of the finished latices and the auxiliary monomers are added gradually to the polymerizing vinyl chloride-ethylene mixture, preferably when a conversion of approximately 40% has been achieved.

A process which is improved with respect to that described in U.S. Pat. No. 3,403,137 is disclosed in British Pat. No. 1,339,182 in which the process is carried out under pressures of from 34 to 207 bar to obtain copolymers having from 6 to 30% of ethylene units. Thus, in Example 7 of that patent a copolymer comprising 25.7% of ethylene units and 74.3% of vinyl chloride units is produced under a pressure of 138.3 bar. However, very long reaction times are required throughout of approximately from 12 to 16 hours with the result that a space-time yield that is only very modest for polymerization processes can be achieved. Furthermore, it is essential in the said patent that the copolymerization be carried out in the total absence of reducing agents, that is to say, without the use of redox catalyst systems which systems are, however, often necessary to achieve certain product characteristics.

U.S. Pat. No. 3,721,636 introduces as novel substances, vinyl chloride-ethylene copolymers containing carboxy groups and necessary to their preparation is the use of a non-carboxylated seed latex in conjunction with a monomer metering operation and the maintenance of a pH value of 0.5 to 5. The feed time for the monomer mixture of vinyl chloride and unsaturated carboxylic acid should be at least 6 hours but feed times of approximately 10 to 16 hours, in conjunction with subsequent reaction times of approximately 3 hours, are preferred. With shorter feed times, too little ethylene is incorporated into the copolymer in that process which process is no more economical than is the process of British Pat. No. 1,339,182.

An extreme variant of the process described in British Pat. No. 1,339,182 is proposed in EP-A- 26 490 which describes polymerization at below the saturation pressure of the monomers. Since very slow polymerization rates result under such "monomer-starved" conditions, unusually high amounts of initiator must be used in that process to permit economically acceptable polymerization times. However, high concentrations of initiator necessarily lead to low molecular weights which, as is known, significantly impair the properties of the polymer relating to application technology. Example 4 of EP-A- No. 26 490 illustrates particularly well the influence of initiator on the molecular weight.

A disadvantage on an industrial scale of the monomer-metering processes described hitherto is the danger of the formation of micro-coagula which have an adverse effect on the use of the latices in many areas of use. These micro-coagula can be filtered off only with difficulty and require additional effort in the industrial manufacture of the latices.

OBJECTS OF THE INVENTION

It is an object of the invention to provide a simpler and faster process for the preparation of aqueous dispersions of copolymers of predominantly vinyl chloride and ethylene without formation of micro-coagula.

This and other objects and advantages of the invention will become obvious from the following detailed description.

THE INVENTION

The process of the invention for the preparation of finely-divided aqueous copolymer dispersions with a solids content of 10 to 70% by weight, based on the dispersion, comprises emulsion polymerizing (a) 1 to 50% by weight of ethylene and (b) 99 to 50% by weight of at least two ethylenically unsaturated comonomers in the presence of a free-radical initiation and at least one member of the group consisting of an emulsifier and a protective colloid and optionally present conventional adjuvants, the ethylenically unsaturated comonomers being (b1) 79.5 to 99.5%, preferably 84.5 to 99.5%, more preferably 89.5 to 99.5%, by weight of vinyl chloride, (b2) 0 to 15%, preferably 0 to 10%, more preferably 0 to 5%, by weight of ethylenically unsaturated oil-soluble monomers, (b3) 0.5 to 10%, preferably 1 to 6%, by weight of ethylenically unsaturated, functional, water-soluble monomers and (b4) to 5% by weight of oil-soluble monomers monoethylenically unsaturated and containing functional groups or polyethylenically unsaturated and mixtures thereof with the proviso that the monomers of (b2) to (b4) are copolymerizable with (a) and (b1), the comonomers being initially present in 1 to 40% by weight and the content of the water-soluble monomers being 1 to 35% by weight of the comonomer phase initially present and the rest of component (b) being added as an aqueous emulsion during polymerization and the polymerization is effected at 0 to 120° C. with an ethylene pressure of 10 to 150 bar which is built up at the latest by the point in time at which polymerization of the initial material is complete.

The process of the invention avoids the problems of the prior art using the same temperatures and the same or much lower pressures to obtain the ethylene content of the copolymer corresponding to the prior art in substantially shorter reaction times and therefore with improved space-time yields. Moreover, the aqueous dispersions of copolymer are free of micro-coagula.

In the process of the invention, the comonomers of component (b) are virtually completely incorporated into the polymer, provided that the polymerization is not deliberately interrupted prematurely, and the ethylene content of the polymer is usually significantly greater than that of conventional polymers manufactured under the same pressure. Analogously, in the case of aqueous dispersion which contain copolymers comprising ethylene and comonomers, especially predominantly vinyl chloride and have ethylene contents of preferably at least 3% by weight, based on the polymer, the ethylene pressure can be lower than that used in the known processes. This becomes even more marked for dispersions of such copolymers that are richer in ethylene, for example have at least 20%, especially at least 27% by weight of ethylene units. Thus, according to the invention, under ethylene pressures of up to 150 bar, preferably from 10 to 90 bar, especially preferably from 30 to 80 bar, especially up to a maximum of 70 bar, but in each case above the saturation pressure of the comonomers and at polymerization temperatures of 0 °to 120° C., preferably 10° to 100° C., especially 40° to 80° C., up to as much as 50% by weight, preferably up to 40%, and especially up to 35%, by weight of ethylene can be incorporated into the copolymer forming in the dispersion.

The polymerization is generally complete after approximately 10 hours and the end of the polymerization can be ascertained more exactly by a distinct reduction in the evolution of heat and in pressure. This is preferably the case approximately from 2 to 3 hours, especially from 1 to 2 hours, after termination of the addition of the comonomers and in preferred embodiments, the duration of polymerization is even shorter, i.e. polymerization is often complete after only 7 to 8 hours as the addition time of the preliminary emulsion often, in advantageous manner, is less than 6 hours.

The addition of the comonomers (b) is effected so that approximately from 1 to 40% by weight, preferably from 3 to 30% by weight, especially preferably from 3 to 10% by weight, is introduced initially and the remainder, preferably with the exception of b3, is metered in during the polymerization in the form of an aqueous emulsion, preferably at the rate at which it is consumed. It is especially preferred for the metering-in to begin only when the concentration of the comonomers, based on the total dispersion, is not more than 25 % by weight, more preferably not more than 20%, especially not more than 10% and, most preferably, not more than 5% by weight, and for it to be carried out so that this limit is not exceeded. It is also preferable for the comonomer concentration to remain above a lower limit of 1% by weight. In the case of polymerization of the material introduced initially, it is advantageously possible for regulators (chain transfer agents) to be used or for other measures for limiting the degree of polymerization which are well known to be taken.

It is, however, also possible to introduce initially a seed latex optionally manufactured in an upstream polymerization step which can have a composition different from that of the comonomers metered in within the limits of the monomers mentioned. For example, a seed latex of this type can have up to 50% by weight of ethylene units and its amount is included in the total amount of the particular monomers. The content of water-soluble monomers of component b3, based on the total amount of comonomers in the manufacture of the seed latex, is between 1 and 35% by weight.

The comonomers can be supplied individually or as a mixture in the form of an aqueous preliminary emulsion(s) and in principle, the composition of the comonomers in the material introduced initially can differ from that of the comonomers metered in. It is also possible to introduce all of one comonomer initially, and to meter in some or all of the other comonomers.

Component (b3) is preferably added to the material introduced initially separate from the other comonomers of (b), or is optionally metered in the form of a separate feed. The other comonomers are preferably introduced initially as a mixture in the form of an aqueous preliminary emulsion and metered in.

In the process of the invention, some or all of the ethylene can be introduced initially at the same time, that is to say, the intended ethylene pressure can already be built up before the start of polymerization. However, it can be built up during the course of polymerization, but at the latest when the polymerization of the material introduced initially is complete or a degree of conversion corresponding to the amount of material introduced initially has been reached, preferably at the latest when the metering-in of the comonomers is begun. The ethylene pressure can optionally also be varied a number of times during polymerization, as desired, within the limits mentioned, that is to say, it can be raised and/or lowered. It is, however, preferably kept constant during the major part of the comonomer metering time and it is preferable then for no more ethylene to be metered in.

There may be mentioned as a comonomer, optionally also of the seed latex, especially vinyl chloride which makes up at least 79.5% by weight, preferably at least 84.5%, especially at least 89.5% by weight of component (b). As further comonomers, optionally also of the seed latex, that are copolymerizable with ethylene and vinyl chloride and are oil-soluble there may be mentioned: ethylenically unsaturated esters such as allyl and, preferably, vinyl esters of non-ethylenically unsaturated, preferably saturated straight-chain, branched or cyclic carboxylic acids, especially of alkanoic acids of 1 to 20 carbon atoms such as vinyl acetate, vinyl propionate, vinyl butyrate, vinyl 2-ethylhexanoate, vinyl laurate, vinyl stearate, vinyl esters of highly branched carboxylic acids which can be manufactured, for example, by means of the so-called Koch synthesis of olefins and carbon monoxide (so-called vinyl ester of Versatic$^{(R)}$ acid) such as monoalkyl and dialkyl esters of ethylenically unsaturated carboxylic acids, especially those of alcohols having from 1 to 18, preferably from 1 to 8 carbon atoms with $\alpha,\beta$-unsaturated monocarboxylic acids of 3 to 8 carbon atoms such as methyl esters of acrylic acid, ethyl, propyl, butyl, 2-ethylhexyl, lauryl and stearyl esters of those carboxylic acids, dialkyl esters of ethylenically unsaturated dicarboxylic acids of 4 to 10 carbon atoms such as the esters of the mentioned alcohols of 1 to 18 carbon atoms with maleic acid, fumaric acid and itaconic acid; and α-olefins, for example propylene and butylene; vinyl ethers and vinyl ketones; vinyl halides such as vinyl fluoride and bromide; and vinylidene halides such as vinylidene chloride.

Preferred are the mentioned esters, especially the vinyl esters, acrylic acid, maleic acid and fumaric acid esters, and the halogen derivatives of ethylene. Especially preferred are the mentioned esters.

Those monoethylenically unsaturated monomers which do not enter into any further reactions, for example do not have a cross-linking action and can be used individually or as a mixture, are contained in the comonomer component (b) in amounts of at most 15% by weight, preferably at most 10% by weight, especially from 0 to 5% weight.

Furthermore, the comonomer component (b) contains at least one further monomer that is copolymerisable with the other monomers, in amounts of from 0.5 to 10% by weight, preferably from 1 to 6% by weight, which is water-soluble at least to 50% by weight at 20° C. and carries at least one functional group. This is under stood to include those compounds which in addition to an ethylenic double bond also contain carboxy radicals i.e. COOH or COO−, sulfonate, hydroxy, phosphonate, phosphate, tertamino, quaternary ammonium, polyethylene oxide or amide optionally substituted by, for example, alkyl, hydroxyalkyl, alkoxyalkyl, alkanoyl or alkanoyl alkyl groups.

Examples of said monomers are acrylic acid, methacrylic acid, itaconic, fumaric acid and maleic acid, the alkali metal or ammonium salts thereof, the monoamides or diamides thereof, especially acrylamide and methacrylamide which can be monosubstituted or disubstituted on the nitrogen by alkyl of 1 to 2 carbon atoms and/or by methylol groups, of which in turn one may also be etherified by alkyl or esterified by alkyl-carboxylic acid, monoesters of the mentioned dicarboxylic acids with the above-mentioned alkanols of 1 to 8 carbon atoms, vinyl and allyl sulfonates, vinyl and allyl phosphonates and phosphates, esters and amides of unsaturated carboxylic acids substituted by sulfonate or styrene substituted by sulfonate, N-vinyl-pyrrolidone, esters or amides of unsaturated carboxylic acids substituted by tertiary amino or quaternary ammonium, or esters of unsaturated carboxylic acids substituted by hydroxy.

Preferred water-soluble comonomers are: Acrylic acid, methacrylic acid, itaconic acid, fumaric acid and maleic acid, the alkali metal and ammonium salts thereof, the monoamides and diamides thereof which can be mono-substituted or disubstituted on the nitrogen by a methylol; monoesters of the mentioned dicarboxylic acids with the above-mentioned of 1 to 3 carbon atoms alkanols, vinyl sulfonates; esters or amides of unsaturated carboxylic acids substituted by sulfonate; styrene substituted by sulfonate; N-vinylpyrrolidone; and esters of unsaturated carboxylic acids substituted with hydroxy. Especially preferred water-soluble monomers are acrylic acid, methacrylic acid, the alkali metal and ammonium salts thereof, acrylamide, methacrylamide, N-methylolacrylamide, N-methylolmethacrylamide, vinyl sulfonate, hydroxyethyl (meth)acrylate, esters and/or amides of (meth)acrylic acid substituted by sulfonate, such as sulfoethyl (meth)acrylate or sulfopropyl (meth)acrylate.

In addition, the comonomer component b can also contain oil-soluble, sparingly water-soluble, preferably water-insoluble, monomers in amounts of from 0 to 5% by weight which in addition to an ethylenic double bond contain at least one functional group or which contain several ethylenic double bonds. The monoethylenically unsaturated monomers may contain as functional groups at least one, preferably one, epoxy group, carboxy, hydroxy, or amide optionally substituted by alkyl, hydroxyalkyl, alkoxyalkyl, alkanoyl or alkanoylalkyl, unless they belong to the compounds of component b3. Examples thereof are vinyl and allyl esters of unsaturated monocarboxylic acids of 3 to 8 carbon atoms, and monovinyl or divinyl and monoallyl or diallyl esters of saturated or unsaturated dicarboxylic acids of 4 to 8 carbon atoms, triallyl cyanurate, and diesters and polyesters of α,β-unsaturated carboxylic acids with polyfunctional alcohols.

The copolymers made by the invention preferably comprise the monomers of the groups a, b1, b3, and optionally b2 and preferably have K values (according to DIN 53 726, measured in tetrahydrofuran: H2O 95:5) of from 20 to 100, especially preferably from 30 to 80, especially from 35 to 70.

The claimed process is carried out in the same way as emulsion polymerization and for the emulsion polymerization, there may be used all customary auxiliaries such as initiators, reducing agents and regulators in customary amounts. It is possible in this case also to introduce these auxiliaries initially or to add them in portions or to meter them in more or less continuously, as desired. Emulsifiers and protective colloids are used at least partially for the manufacture of the emulsion of the comonomers in water and are added therewith to the batch and the emulsifiers and protective colloids suitable for the process according to the invention are known to a person skilled in the art. In a special embodiment, in the case of the manufacture of a seed latex, regulators (chain transfer agents) can be added in such amounts that the mean degree of polymerization is kept within the range of up to, for example, 100.

In principle, virtually all surface-active substances are suitable for use in emulsion polymerization and the requirements of the application technology, the monomers used, and the reaction conditions determine the choice in an actual case. The amounts used are between 0 and 10% by weight, preferably between 1 and 5% by weight, in each case based on component (b).

Anionic and cationic, as well as non-ionic and amphoteric surfactants can be used in principle for emulsion polymerization of the process of the invention and preferred are anionic and non-ionic emulsifiers. The emulsifiers which may be used in the process are classified according to their chemical nature, for example in Stache, "Tensid-Taschenbuch", page 159 ff. Munich 1979.

As anionic surfactants for emulsion polymerization in the process of the invention, there are preferred:

1. Alkyl sulfates, especially those of 8 to 18 carbon atoms, alkyl and alkylaryl ether sulfates of 8 to 18 carbon atoms in the hydrophobic radical and from 1 to 40 ethylene or propylene oxide units.

2. Sulfonates, especially alkyl sulfonates of 8 to 18 carbon atoms, alkylaryl sulfonates of 8 to 18 carbon atoms, taurides, esters and semiesters of sulfosuccinic acid with monovalent alcohols or alkylphenols of 4 to 15 carbon atoms; these alcohols or alkylphenols may also optionally be ethoxylated with 1 to 40 ethylene oxide (EO) units.

3. Alkali metal and ammonium salts of alkyl, aryl, alkaryl or aralkyl carboxylic acids of 8 to 20 carbon atoms;

4. Phosphoric acid partial esters and the alkali metal and ammonium salts thereof, especially alkyl or alkylaryl phosphates of 8 to 20 carbon atoms in the organic radical, alkyl or alkylaryl ether phosphates of 8 to 20 carbon atoms in the alkyl or alkylaryl and from 1 to 40 ethyleneoxide units.

As non-ionic surfactants there are suitable:

1. Alkylpolyglycol ethers preferably of 8 to 40 ethyleneoxide units and alkyl radicals of 8 to 20 carbon atoms.

2. Alkylarylpolyglycol ethers preferably of 8 to 40 ethyleneoxide units and 8 to 20 carbon atoms in the alkyl and aryl radicals and 3. Ethyleneoxide/propylene oxide (EO/PO) block copolymers preferably of 8 to 40 EO or PO units.

In addition, all compounds that can be used as protective colloids in emulsion polymerization are suitable for use in the process of the invention, preferably in amounts of up to 15% by weight, based on component (b). There are preferred:

1. Vinyl alcohol/vinyl acetate copolymers manufactured by means of hydrolysis and containing 80 to 100, especially preferably 86 to 90, mole % of vinyl alcohol units and having a molecular weight, determined viscosimetrically, of from 15,000 to 100,000.

2. Cellulose derivatives, especially hydroxyethylcelluloses having a molecular weight of from 50 000 to $10^6$ and a degree of substitution range of 1.5 to 3 and 3. Polyvinylpyrrolidones having a molecular weight of 5,000 to 400,000.

It is also possible to use different types of emulsifiers during different stages of the reaction. Thus, especially in the case of the use of the seed latex process, the emulsifier system used in the manufacture of the seed latex can, in principle, differ from that used in the actual polymerization if the effects of the different emulsifiers do not cancel each other out, for example by reacting with one another.

The polymerization is initiated by methods customarily used for emulsion polymerization and especially suitable are at least partially water-soluble, preferably completely water-soluble, inorganic or organic peroxide compounds such as peroxo compounds and hydroperoxides and water-soluble azo compounds. Examples thereof are alkali metal and ammonium peroxosulfates, peroxodisulfates and peroxophosphates, hydrogen peroxide, tert.-butylhydroperoxide, and azobis-cyanovaleric acid.

The mentioned peroxide initiators may optionally also be combined in known manner with reducing agents, examples of which are alkali metal formaldehyde sulfoxylates [Brüggolith$^{(R)}$ and Rongalit$^{(R)}$], alkali metal hydrogen sulfites, sulfites and thiosulfates, and ascorbic acid. The known per se, addition, of small amounts of heavy metal compounds such as iron-II salts is often expedient.

The pH range desired for polymerization, which range is generally between 2.5 and 10, especially 3 and 8, can be kept constant in a manner known per se with suitable buffer systems, for example phosphate or carbonate buffer.

The polymer dispersions or polymers containing predominantly vinyl chloride and ethylene produced by the invention can be used in all fields for which known vinyl chloride/ethylene copolymers are suitable. Thus, dispersions of the invention are, for example especially suitable for use in the manufacture of adhesives for wood, paper, plastics sheets or imitation leather, as binders for textiles or in paints, or for coating paper. The polymer obtained from the dispersion by separating off the water can be processed by melting to form shaped articles, or, after being dissolved in a suitable solvent, used in the manufacture of lacquers or adhesives.

In the following examples there are described several preferred embodiments to illustrate the invention but it is to be understood that the invention is not intended to be limited to the specific embodiments.

EXAMPLE 1

3800 g of demineralized water, 27 g of sodium dodecylbenzenesulfonate, 28 g of sodium vinylsulfonate, 21 g of acrylamide and 42 g of acrylic acid were introduced into a 16 liter autoclave and the pH was adjusted to 3.5 with concentrated ammonium hydroxide solution (approximately 5 ml). The mixture was heated to 70° C. and then 410 g of vinyl acetate and 1 g of t-butyl hydroperoxide, followed over a period of approximately 5 minutes by a solution of 25 g of ammonium peroxodisulfate in 240 g of water, were added thereto. 30 minutes later, ethylene was added until a pressure of 65 bar had been reached and then, while the ethylene pressure was kept constant, a preliminary emulsion comprising 2800 g of demineralized water, 55 g of sodium dodecylbenzenesulfonate 15 g of ammonium peroxodisulfate, 15 g of concentrated ammonium hydroxide solution and 5500 g of vinyl chloride was uniformly metered in over a period of 6 hours. The mixture was then left for another hour to react and, after the pH had been adjusted to 7, it was cooled and released to obtain a stable, finely divided dispersion with a solids content of 51.5% and a minimum film-forming temperature of 19° C. (glass transition temperature 20° C.). It could be emptied through a 70 μm sieve without leaving a residue and the coating was clear and free from specks. The vinyl chloride/ethylene copolymer contained 20.4% by weight of ethylene units incorporated by polymerization.

COMPARATIVE TEST A

Example 1 was repeated with the difference that the aqueous phase of the preliminary emulsion and the vinyl chloride were metered in separately and a dispersion with a solids content of 50% resulted. It did not form a film at room temperature (glass transition temperature 30° C.) and when the dispersion was emptied through a 70 μm sieve, a residue of 40 g remained. The coating showed the presence of micro-coagula and the vinyl chloride/ethylene copolymer contained 16.8% by weight of the ethylene units.

EXAMPLE 2

325 kg of deionized water, 0.9 kg of a sodium alkyl sulfonate (the alkyl having approx. 15 carbon atoms), 5.3 kg tridecylpolyglycolether (approx. 15 glycol units), 3.3 kg of sodium vinyl sulfonate, 2.2 kg of acrylamide, 4.4 kg of acrylic acid, 18 kg of vinyl laurate and 3 kg of butyl acrylate were initially placed in a 16 m³ polymerization autoclave, and adjusted to a pH of 3.5 by addition of concentrated ammonium hydroxide. The vessel was evacuated, flushed with nitrogen, and after being evacuated again, was heated to 50° C. Then, 60 kg of vinyl chloride were emulsified therein, and the emulsion was saturated with ethylene up to a pressure of 66 bar. Polymerization was initiated by adding 2 kg/h of each of two solutions of the components of a redox initiator system (oxidation component 8.4 kg of ammonium persulfate, 5 kg of concentrated ammonium hydroxide and 134 kg of water; reduction component: 4.2 kg of sodium formaldehyde sulfoxylate and 140 kg of water).

30 minutes after polymerization had commenced, metering in of a preemulsion was begun, which preemulsion consisted of 244 kg of deionized water, 80 kg of the above solution of reduction component, 17.6 kg of the tridecylpolyglycolether and 565 kg of vinyl chloride. The preemulsion was metered in at a constant rate for 8 hours and no more ethylene was fed in. When starting to meter in the preemulsion, the metering in of the above solution of the reduction component was interrupted and not started again before the addition of the preemulsion had ended. Then the dispersion was post-polymerized for two hours and the dispersion was adjusted to a pH of 7.5 with an ammonium hydroxide solution of 12.5% strength, cooled and released from pressure. To evacuate the residual vinyl chloride, it was further evacuated for 1 hour and then the whole charge was filtered through a sieve of 70 μm width without any difficulty. The residue on the sieve were 61 g and the dispersion had a solids content of 51% and a minimal film-forming temperature (MFT) of 0° C. The dispersion gave a clear film free of specks and the copolymer contained 25% by weight of ethylene units.

COMPARATIVE EXPERIMENT B

Example 2 was repeated with the modification that vinyl chloride was metered in separately from the aqueous phase of the above preemulsion. The resulting dispersion could not be filtered through a sieve of 70 μm width. When filtering a small sample in the laboratory, a residue of 8.6 kg could be calculated for the whole disperison which gave a film full of specks.

EXAMPLE 3

3500 g of deionized water, 15 g of sodium laurylsulfate, 60 g of tridecylpolyglycolether (approx. 15 units), 20 g of sodium vinylsulfonate, 20 g of acrylic acid, 3 g of acrylamide, 100 g of butyl acrylate, and 150 g of vinyl laurate were initially placed in a 16 liter autoclave under stirring and was adjusted to a pH of 3.5 by addition of a 12.5% ammonium hydroxide solution. Then the vessel was evacuated, flushed with nitrogen, again evacuated, and heated to 70° C. 700 g of vinyl chloride were added and the so formed emulsion was saturated with ethylene up to a pressure of 50 bar. Polymerization was initiated by adding 20 g of ammonium persulfate in 200 g of water within 5 minutes and 45 minutes after polymerization had commenced, three feed solutions were started to be metered in separately from each other. (1) 20 g of ammonium persulfate in 500 g of water, (2) 100 g of acrylic acid, 20 g of 2-hydroxyethyl acrylate and 30 g of 25% ammonium hydroxide in 330 g of water and (3) a preemulsion of 2825 g of water, 75 g of sodium laurylsulfate, 160 g of the above tridecyclpolyglycolether, 20 g of sodium vinylsulfonate and 5600 g of vinyl chloride at constant rates for 7 hours.

Thereafter the dispersion was post-polymerized for another two hours at 70° C. and no more ethylene was added during the polymerization, the final pressure being 23 bar. After adjusting to a pH of 7.1 with 12.5% ammonium hydroxide, the dispersion was cooled, released from pressure and evacuated for 30 minutes to remove residual vinyl chloride. The dispersion had a solids content of 50% and a MFT of 38° C. The dispersion could be filtered through the above sieve without any residue and gave a film free of specks.

EXAMPLE 4

3330 g of deionized water, 20 g of tridecylpolyglycolether (approx. 15 glyclol units), 30 g of sodium vinylsulfonate, 3 g of acrylamide, 20 mg of iron ammonium sulfate, and 250 g of vinyl versatate (ester of a Versatic$^{(R)}$ acid having 10 carbon atoms) were initially placed in a 16 liter polymerization autoclave which was then evacuated, flushed with nitrogen and heated to 70° C. after having been evacuated again. 700 g of vinyl chloride were added and the emulsion was saturated with ethylene up to 65 bar. Polymerization was initiated by metering in 60 g/h of each of the two redox-components (oxidation component: 84 g of ammonium persulfate in 750 g of water; reduction component: 42 g of sodium formaldehyde sulfoxylate in 790 g of water). 30 minutes after polymerization had commenced, a solution of 110 g of acrylic acid and 20 g of 2-hydroxyethyl acrylate in 300 g of water and a preemulsion of 2530 g of water, 100 g of sodium laurylsulfate, 10 g of sodium vinylsulfonate, 40 g of N-butoxymethylacrylamide, 30 g of 25% ammonia, 460 g of the reduction component and 5600 g of vinyl chloride were metered in for 9 hours at constant rates. The separate solution of the reduction component was not metered in as long as the preemulsion was added.

After addition of the preemulsion had ended, the dispersion was post-polymerized for another 2.5 hours by further adding initiator. No more ethylene was added during the polymerization and the final pressure was 54 bar. After adjusting to a pH of 7 and working up as in Example 3, a dispersion having a solids content of 51.6% and a MFT of 13° C. could be filtered through the above sieve without any residue and the dispersion gave a clear film free of specks.

EXAMPLE 5

3340 g of deionized water, 30 g of tridecylpolyglycolether (approximately 15 glycol units), 20 g of sodium vinylsulfonate, and 200 mg of iron ammonium sulfate were initially placed in a 16 l polymerization autoclave, which was then evacuated, flushed with nitrogen and heated to 50° C. after having been evacuated again.

100 g of vinyl versatate (ester of a Versatic$^{(R)}$ acid having 10 C-atoms) and 400 g of vinyl chloride were added and emulsified and the emulsion was saturated with ethylene up to 65 bar.

The polymerization was initiated by metering in 50 g/h of each of the two redox-components (oxidation component: 55 g of sodium persulfate in 750 g of water; reduction component: 25 g of sodium formaldehyde sulfoxylate in 750 g of water).

Approximately 45 minutes after the initiator feed had commenced (the solids content had reached 7%) 75 g/h of a solution of 100 g of acrylic acid and 60 g of 2-hydroxyethyl acrylate, 30 g of acrylamide and 6 g of ammonia in 390 g of water and 1100 g/h of a preemulsion of 2670 g of water, 168 g of a sodium salt of a sulfated tridecylpolyglycolether (having aproximately 2.5 glycol units), 10 g of sodium vinylsulfonate and 6100 g of vinyl chloride were metered in.

After the addition of the preemulsion had ended, the dispersion was post-polymerized for another 1.5 hours by further adding initiator.

No further ethylene was added during the polymerization, the final pressure was 48 bar. After adjusting to a pH of 7 the dispersion was cooled down, released from pressure and evacuated for 30 minutes to remove residual vinyl chloride.

A dispersion having a solids content of 52.0% and a MFT OF 22° C. could be filtered through a sieve of 70 μm without any residue or coagulate. The dispersion gave a clear film free of specks. The ethylene content of the polymer was 20%.

EXAMPLE 6 (COMPARISON)

The above Example 5 was repeated with the modification that in the preemulsion, the vinyl chloride content was 5600 g, that it further contained 500 g of methyl methacrylate and that it was metered in at 1000 g/h. The final pressure was 63 bar.

Although the reaction period was prolonged by approximately one hour, a dispersion of only 50.3% solids content was obtained which contained many specks. The MFT was 35° C., the ethylen content of the polymer was only 15%.

Various modifications of the process and products of the invention may be made without departing from the spirit or scope thereof and it should be understood that the invention is intended to be limited only as defined in the appended claims.

What we claim is:

1. A process for the preparation of finely-divided aqueous copolymer dispersions with a solids content of 10 to 70% by weight, based on the dispersion, comprising emulsion polymerizing (a) 1 to 50% by weight of ethylene and (b) 99 to 50% by weight of at least two ethylenically unsaturated comonomers in the presence of a free-radical initiator and at least one member of the group consisting of an emulsifier and a protective colloid, the ethylenically unsaturated comonomers being (b1) 79.5 to 99.5% by weight of vinyl chloride, (b2) 0 to 15% by weight of at least one ethylenically unsaturated oil-soluble monomer selected from the group consisting of vinyl esters of alkanoic acids of 1 to 20 carbon atoms, esters of alkanols of 1 to 18 carbon atoms and α,β-unsaturated monocarboxylic acids of 3 to 8 carbon atoms except esters of methacrylic acids, dialkyl esters of ethylenically unsaturated dicarboxylic acids of 4 to 10 carbon atoms and alkanols of 1 to 18 alkyl carbon atoms, vinyl ethers, vinyl ketone, α-olefins, vinyl halides and vinylidene halides, (b3) 0.5 to 10% by weight of ethylenically unsaturated, functional, water-soluble monomers and (b4) 0 to 5% by weight of oil-soluble monomers monoethylenically unsaturated and containing functional groups or polyethylenically unsaturated and mixtures thereof with the proviso that the monomers of (b2) and (b4) are copolymerizable with (a) and (b1), the comonomers being initially present in 1 to 40% by weight and the content of the water-soluble monomers is 1 to 35% by weight of the comonomer phase initially present and the rest of component (b) being added as an aqueous emulsion during polymerization and vinyl monomer metering is begun when the vinyl monomer content of the dispersion is at most 25% by weight and is carried out so that the limit is not exceeded and the polymerization is effected at 0° to 120° C. with an ethylene pressure of 10 to 150 bar which is built up at the latest by the point of time at which polymerization of the initial material is complete.

2. The process of claim 1 wherein the b component is comprised of vinyl chloride and optionally at least one component selected from the group consisting of (b2) ethylenically unsaturated esters of monoethylenically unsaturated, and saturated straight-chain, branched or cyclic carboxylic acids and/or alkyl esters of ethylenically unsaturated carboxylic acids and/or halogen derivatives of ethylene and (b3) ethylenically unsaturated monomers additionally containing a carboxy, an optionally substituted amide, a sulfonate, a phosphate, or a hydroxy group.

3. The process of claim 1 wherein the component (b2) is at least one member of the group consisting of vinyl esters of alkanoic acids of 1 to 20 carbon atoms, esters of alkanols of 1 to 18 carbon atoms and α,β-unsaturated monocarboxylic acids of 3 to 8 carbon atoms, dialkyl esters of ethylenically unsaturated dicarboxylic acids of 4 to 8 carbon atoms and alkanols of 1 to 18 alkyl carbon atoms, vinyl ethers, vinyl ketones α-olefins, vinyl halides and vinylidene halides.

4. The process of claim 1 wherein component (b3) is at least one member of the group consisting of acrylic acid, methacrylic acid, the alkali metal and ammonium salts thereof, acrylamide, methacrylamide, N-methylolacrylamide, N-methylolmethacrylamide, vinyl sulfonate, hydroxyethyl (meth)acrylate, sulfoethyl (meth)acrylate and sulfpropyl (meth)acrylate.

5. The process of claim 1 wherein a seed latex manufactured in a preliminary step is introduced initially.

6. The process of claim 1 wherein the ethylene pressure is kept constant until the end of the metering-in of the vinyl monomers.

7. The process of claim 1 wherein the amount of (b1) is 89.5 to 99.5%, the amount of (b2) is 0 to 10% and the amount of (b3) is 1 to 6%.

8. The process of claim 1 wherein the amount of (b1) is 89.5 to 99.5%, the amount of (b2) is 0 to 5% and the amount of (b3) is 1 to 6%.

9. The process of claim 1 wherein the ethylene content in the copolymer is at least 20%.

* * * * *

UNITED STATES PATENT AND TRADEMARK OFFICE
CERTIFICATE OF CORRECTION

PATENT NO. : 4,847,341

DATED : July 11, 1989

INVENTOR(S) : PETER BALL, KLAUS MARQUARDT, AND MANFRED SELIG

It is certified that error appears in the above-identified patent and that said Letters Patent is hereby corrected as shown below:

| Col. | Line | | |
|---|---|---|---|
| | Claim 1 | | |
| 12 | 13 | "at" should be --as-- | |
| 12 | Claim 3 32 | "4 to 8 carbon atoms" should be --4 to 10 carbon atoms-- | |

Signed and Sealed this

Twenty-sixth Day of March, 1991

Attest:

HARRY F. MANBECK, JR.

Attesting Officer

Commissioner of Patents and Trademarks